(12) United States Patent
Close

(10) Patent No.: US 7,646,310 B2
(45) Date of Patent: Jan. 12, 2010

(54) SYSTEM FOR COMMUNICATING DOWNHOLE INFORMATION THROUGH A WELLBORE TO A SURFACE LOCATION

(76) Inventor: David Close, 4004 Tejon Cir., Austin, TX (US) 78734

( * ) Notice: Subject to any disclaimer, the term of this patent is extended or adjusted under 35 U.S.C. 154(b) by 576 days.

(21) Appl. No.: 11/460,180

(22) Filed: Jul. 26, 2006

(65) Prior Publication Data

US 2008/0024319 A1   Jan. 31, 2008

(51) Int. Cl.
*G01V 3/00* (2006.01)
(52) U.S. Cl. .................... 340/854.3; 367/82; 367/85
(58) Field of Classification Search .............. 340/854.3; 367/82, 85
See application file for complete search history.

(56) References Cited

U.S. PATENT DOCUMENTS 6,714,138 B1 * 3/2004 Turner et al. ............. 340/854.3

6,898,150 B2 * 5/2005 Hahn et al. .................... 367/85

* cited by examiner

*Primary Examiner*—Albert K Wong
(74) *Attorney, Agent, or Firm*—Egbert Law Offices PLLC

(57) ABSTRACT

A pressure release encoding system for communicating downhole information through a wellbore to a surface location has a valve for providing a fluid restriction to fluid passing in the wellbore, a sensor positioned in the wellbore for sensing a downhole condition in the wellbore, an actuator cooperative with the valve for moving the valve between at least two positions in timed relation to the downhole condition sensed by the sensor, and a detector positioned at the surface location for providing a measurement value at the surface location correlative to the time between the changes of the pressure of the fluid in the wellbore. The sensor is an inclination sensor for sensing an angle of inclination of a drill bit in the wellbore.

15 Claims, 5 Drawing Sheets

SYSTEM FOR COMMUNICATING DOWNHOLE INFORMATION THROUGH A WELLBORE TO A SURFACE LOCATION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a system and method for transmitting information from a downhole location to surface location. More particularly, the present invention relates to a system and method for communicating the inclination angle at the bottom of a wellbore to a surface location in a generally realtime fashion without the need for wirelines or remote transmission. Additionally, the present invention relates to pressure release encoded systems that do not require a valve to close against the restricted mud pressure in order to pass data to the surface. The present invention also relates to the use of timed pressure losses to transmit a downhole condition data set to the surface.

BACKGROUND OF THE INVENTION

In underground drilling, such as gas, oil or geothermal drilling, a bore is drilled through a formation deep in the earth. Such bores are formed by connecting a drill bit to sections of long pipe, referred to as a "drill pipe," so as to form an assembly commonly referred to as a "drill string" that extends from the surface to the bottom of the borehole. The drill bit is rotated so that it advances into the earth, thereby forming the bore. In rotary drilling, the drill bit is rotated by rotating the drill string at the surface. In directional drilling, the drill bit is rotated by a downhole mud motor coupled to the drill bit; the remainder of the drill string is not rotated during drilling. In a steerable drill string, the mud motor is bent at a slight angle to the centerline of the drill bit so as to create a side force that directs the path of the drill bit away from a straight line. In any event, in order to lubricate the drill bit and flush cuttings from its path pumps on the surface pump fluid at a high pressure, referred to as "drilling mud", through an internal passage in the drill string and out through the drill bit. The drilling mud then flows to the surface through the annular passage formed between the drill string and the cut formation borehole.

Depending on the drilling operation, the pressure of the drilling mud flowing through the drill string will typically be between 500 psi and 5000 psi. Some of this pressure is lost at the drill bit so that the pressure of the drilling mud flowing outside the drill string is less than that flowing inside the drill string. In addition, the components of the drill string are also subjected to wear and abrasion from drilling mud, as well as the vibration of the drill string.

The distal end of a drill string is the bottom hole assembly (BHA), which includes the drill bit, the bit sub and drill collars. In "measurement while drilling" (MWD) applications, sensing modules in the BHA provide information concerning the direction of the drilling. This information can be used, for example, to control the direction in which the drill bit advances in a steerable drill string. Such sensors may include a magnetometer to sense azimuth and accelerometers to sense inclination and tool face direction.

Historically, information concerning the conditions in the well, such as information about the formation being drilled through, was obtained by stopping drilling, removing the drill string, and lowering sensors into the bore using a wireline cable, which were then retrieved after the measurements had been taken. This approach was known as wireline logging. More recently, sensing modules have been incorporated into the BHA to provide the drill operator with essentially realtime information concerning one or more aspects of the drilling operation as the drilling progresses. In "logging while drilling" (LWD) applications, the drilling aspects about which information is supplied comprise characteristics of the formation being drilled through. For example, resistivity sensors may be used to transmit, and then receive, high frequency wavelength signals (e.g., electromagnetic waves) that travel through the formation surrounding the sensor. By comparing the transmitted and received signals, information can be determined concerning the nature of the formation through which the signal traveled, such as whether it contains water or hydrocarbons. Other sensors are used in conjunction with magnetic resonance imaging (MRI). Still other sensors include gamma scintillators, which are used to determine the natural radioactivity of the formation, and nuclear detectors, which are used to determine the porosity and density of the formation.

In traditional LWD and MWD systems, electrical power is supplied by a turbine driven by the mud flow. More recently, battery modules have been developed that are incorporated into the BHA to provide electrical power.

In both LWD and MWD systems, the information collected by the sensors must be transmitted to the surface, where it can be analyzed. Such data transmission is typically accomplished using a technique referred to as "mud pulse telemetry." In a mud pulse telemetry system, signals from the sensor modules are typically received and processed in a microprocessor-based data encoder embodied in a collar as part of the BHA, which digitally encodes the sensor data. A controller in the control module then actuates a pulser, also incorporated into the BHA, that generates pressure pulses within the flow of drilling mud that contains the encoded information. The pressure pulses are defined by a variety of characteristics, including amplitude (the difference between the maximum and minimum values of the pressure), duration (the time interval during which the pressure is increased), shape, and frequency (the number of pulses per unit time). Various encoding systems have been developed using one or more pressure pulse characteristics to represent binary data (i.e., bit 1 or 0)—for example, a pressure pulse of 0.5 second duration represents binary 1, while a pressure pulse of 1.0 second duration represents binary 0. The pressure pulses travel up the column of drilling mud flowing down to the drill bit, where they are sensed by a strain gauge-based pressure transducer. The data from the pressure transducers are then decoded and analyzed by the drilling rig operating personnel.

In the past, various patents have issued relating to the transmission of downhole condition to a surface location. U.S. Pat. No. 3,867,714, issued on Feb. 18, 1975 to B. J. Patton, describes a logging-while-drilling (LWD) system which is positioned within the drill string of a well drilling apparatus. The system includes a tool which has a turbine-like, signal-generating valve which rotates to generate a pressure wave signal in the drilling fluid which is representative of a measured downhole condition.

U.S. Pat. No. 4,520,468, issued on May 28, 1985 to S. A. Scherbatskoy, provides measurement-while-drilling (MWD) systems. The measurements are transmitted to the earth by a pulser which produces common responses to electrical signals from a measuring instrument, and pressure pulses in the drilling fluid which are detected and decoded at the surface of the earth. The pulser is mounted in a special pulser sub which is of short length and enlarged internal diameter compared to the standard drill pipe and which is threadly secured at each end to the drill string. An elongated housing is supported by the pulser sub. This elongated housing contains instrumentation or batteries and is connected to the pulser.

U.S. Pat. No. 4,562,560, issued on Dec. 31, 1985 to A. W. Kamp, provides a method and means for transmitting data through a drill string in a borehole. The data is in the form of pressure waves (such as pressure pulses) which are generated by means of a downhole mud motor that is driven by the drilling mud. The pressure waves are generated by varying the load on the mud motor according to a predetermined pattern that is representative of the data to be transmitted.

U.S. Pat. No. 5,679,894, issued on Oct. 21, 1997 to Kruger et al., describes a drilling system in which sensors are placed at selected locations in the drill string so as to continually measure various downhole operating parameters, including the differential pressure across the mud motor, rotational speed of the mud motor, torque, temperature, pressure differential between the fluid passing through the mud motor and the annulus between the drill string and the borehole, and the temperature of the circulating fluid. A downhole control circuit has a microprocessor so as to process signals from the sensors and transmit the process data uphole to a surface control unit by way of suitable telemetry.

U.S. Pat. No. 6,105,690, issued on Aug. 22, 2000 to Biglin, Jr. et al., provides a method and apparatus for communicating with a device downhole in a well, such as a sub in the BHA at the end of the drill string. Pressure pulses, such as those generated by the pistons of the mud pump, are transmitted through the drilling mud to a pressure pulsation sensor in the BHA. Based on its analysis of the pressure pulsations, the sensor can decipher a command from the surface so as to direct the steering of a steerable drill string.

U.S. Pat. No. 6,443,228, issued on Sep. 3, 2002 to Aronstam et al., is a method for utilizing flowable devices in wellbores. These flowable devices are used to provide communication between surface and the downhole instruments so as to establish a communication network in the wellbore. The flowable devices are adapted to move with a fluid flowing in the wellbore. The flowable device can be a memory device or a device that can provide a measurement of a parameter of interest. The flowable devices are introduced into the flow of a fluid flowing through a wellbore. The fluid moves the device in the wellbore. The flowable device is returned to the surface with the returning fluid.

U.S. Pat. No. 6,691,804, issued on Feb. 17, 2004 to W. H. Harrison, describes a directional borehole drilling system and method. Instrumentation located near the bit measures the present position when the bit is static and a dynamic toolface measures position when the bit is rotating. The data is processed to determine the error between present position and a desired trajectory.

U.S. Pat. No. 6,714,138, issued on Mar. 30, 2004 to Turner et al., discloses a method and apparatus for transmitting information to the surface from downhole in a well in which a pulser is incorporated into the BHA of a drill string that generates pressure coded pulses to contain information concerning the drilling operation. The pressure pulses travel to the surface where they are detected and decoded so as to decipher the information. The pulser includes a stator forming passages through which drilling fluid flows on its way to the drill bit. The rotor has blades that obstruct the flow of the drilling fluid through the passage when the rotor is rotated into a first orientation and when rotated into a second orientation, such that the oscillation of the rotor generates the encoded pressure pulses. An electric motor, under the operation of a controller, drives a drive train that oscillates the rotor between the first and second orientation. The controller controls one or more characteristics of the pressure pulses by varying the oscillation of the rotor. The controller may receive information concerning the characteristics of the pressure pulses from a pressure sensor mounted proximate the BHA, as well as information concerning the angular orientation of the rotor by means of an encoder. The controller may also receive instructions for controlling the pressure pulse characteristics from the surface by means of encoded pressure pulses transmitted to the pulser from the surface that are sensed by the pressure sensor and decoded by the controller.

Conventional downhole tools, MWD tools and steering tools typically will use a dedicated mud pulser (valve) that requires a large amount of power to actuate the valve and modulate the mud pressures in a manner that can be detected with a pressure transducer at the surface. These tools are cost prohibitive as a means of transmitting the direction of the borehole when drilling vertical boreholes. Typically, periodic measurement of the "verticality of the well" is required by measuring the inclination of the borehole as the well is drilled deeper. Most vertically drilled wells use a cost-effective mechanical "drift indicator" that is lowered via a wireline into the well to make the inclination measurements at the required depth and pulled out of the hole to read the inclination. Mechanical drift tools are currently being replaced by electronic drift indicators. The industry has a need for a cost effective tool that can send inclination information to the surface without requiring the stopping of the drilling operation and the running of the wireline tool into the wellbore.

It is an object of the present invention to provide a cost effective system for communicating downhole directional information to the surface.

It is another object of the present invention to improve the existing use of the float valve (i.e. the reverse flow functionality) by imposing a pressure release encoding system.

It is another object of the present invention to provide a system and method that does not require significant modification of the drilling sub which is already employed in the BHA.

It is a further object of the present invention to provide a pressure release encoding system and method which utilizes a minimal amount of power during the transmission of pressure information to the surface.

It is a further object of the present invention to provide a system and method whereby downhole conditions can be monitored in a relatively realtime manner at a surface location.

It is a further object of the present invention to make use of shock and movement sensors to allow the tool to automatically activate when in a borehole and automatically shut down when not needed such that surface communication to the tool is not required prior to running the tool down hole.

These and other objects and advantages of the present invention will become apparent from a reading of the attached specification and appended claims.

BRIEF SUMMARY OF THE INVENTION

The present invention is a system for communicating downhole information through a wellbore to a surface location. This system comprises a valve for providing a flow restriction to fluid passing in the wellbore, a sensor positioned in the wellbore for sensing a downhole condition in the wellbore, an actuator cooperative with the valve for moving the valve between at least two positions in timed relation to the downhole condition sensed by the sensor, and a detector positioned at the surface location and cooperative with the fluid passing in the wellbore for providing a measurement value at the surface location correlative to the time between the changes of the pressure of the fluid in the wellbore.

The system of the present invention further includes a drill bit, a drill sting, and a drilling sub interconnected between the drill string and the drill bit. The valve and actuator are positioned within the drilling sub.

The valve includes a float valve that is mounted in the drilling sub in a manner suitable for controlling flow of drilling mud in the wellbore. The float valve is normally used for controlling only reverse flow in the BHA. The present invention utlizes the same float valve to modulate pressure in the forward direction using a pressure release encoding system. The actuator serves to move the float valve between at least two positions. The float valve, in particular, includes a housing positioned in the drilling sub, a piston slidably movable in the housing, and a piston stem connected to the piston and extending outwardly of the housing. The actuator acts on the piston stem so as to move the piston in the housing in timed relation between the two positions. In particular, the actuator includes an actuator piston movable between a first position and a second position. The actuator piston bears on the piston stem opposite the piston of the float valve so as to impede an axial advancement of the valve piston stem.

A pumping means is positioned at the surface location for pumping drilling mud into the wellbore. The detector serves to detect a change of pressure of the drilling mud. A logic system correlates the sensed time between the changes of pressure to the downhole condition. A display serves to provide a generally realtime humanly perceivable indication of this downhole condition.

In the preferred embodiment of the present invention, the sensor is an inclination sensor for sensing an angle of inclination of the drill bit. It is this angle of inclination which is the downhole condition. The logic system serves to correlate the sensed time to the angle of inclination.

The pressure release encoding system of the present invention is also a method of communicating within a wellbore that comprises the steps of: (1) forming a flow restriction within the circulation system in the wellbore; (2) applying a quantified pressure of drilling mud in the circulation system against the flow restriction; (3) sensing a quantifiable downhole condition; (4) measuring a differential pressure across the flow restriction; (5) releasing a first percentage of the pressure within the flow restriction at a first time; (6) releasing a second percentage of the pressure within the flow restriction at a second time such that the time between the first time and the second time is correlative of the downhole conditions; and (7) determining the downhole condition at a surface location by sensing the time between the changes of pressure.

In the method of the present invention, the float valve is positioned in the fluid passageway in the drilling sub. The flow restriction is the float valve. Additionally, an actuator is positioned in the drilling sub such that an actuator piston cooperates with the float valve. The actuator piston is moved between a first position and a second position so as to cause the float valve to release the first percentage of pressure and the second percentage of pressure. The step of detecting includes measuring a time between the release of the first percentage of pressure and the release of the second percentage of pressure and then correlated this time to the downhole condition.

In the preferred method of the present invention, the step of sensing includes sensing an angle of inclination of a drill bit within the wellbore. A time value is assigned to the sensed angle of inclination. The actuator piston is moved between the first position and the second position at a time equal to the assigned time value.

DETAILED DESCRIPTION OF THE INVENTION

Figure 1:
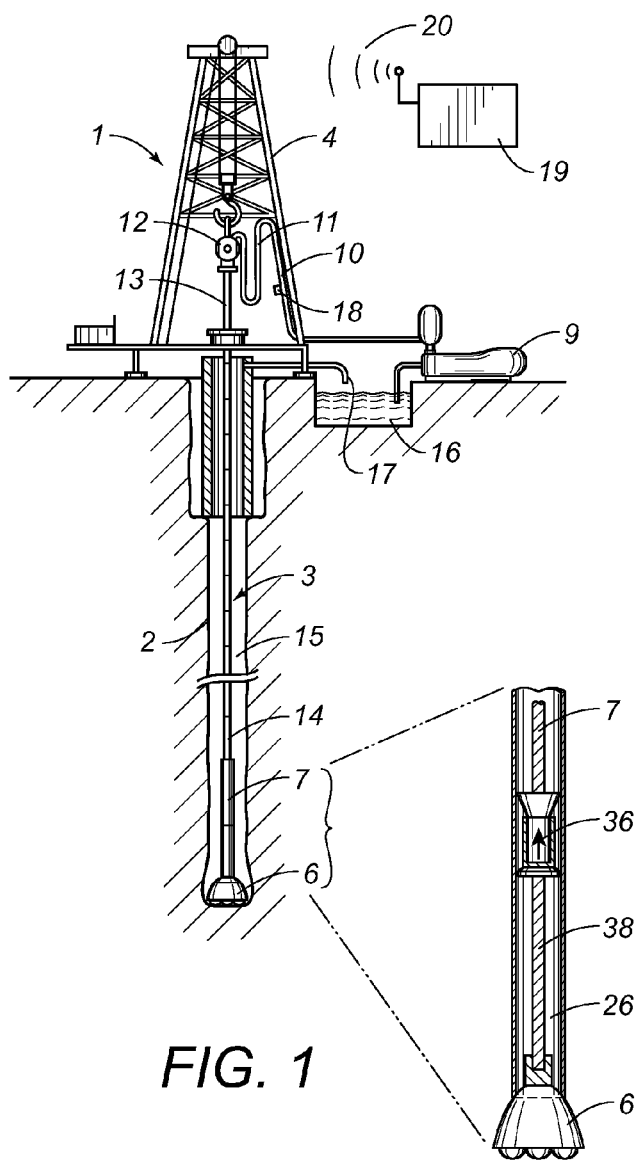
FIG. 1 is a diagrammatic, partially schematic, illustration of a drilling operation employing the method and system of the present invention.

FIG. 1 shows a conventional drilling rig 1 located at a site above the borehole 2. The drill string 3 is supported by the derick 4 and includes a drill collar 5 and a drill bit 6. A float valve 7 resides inside the drill collar 5. A downhole tool 8 also resides inside the drill collar 5 and includes a microprocessor-controlled device, an actuator and an inclination sensing device. The downhole tool is described in greater detail in FIG. 2.

The drilling rig 1 includes a mud pump system. The flow of the mud pump system is generated by mud pumps 9 through the stand pipe 11, the mud hose 11, the swivel 12, the kelly 13, down the drill pipe 14, and through the float valve 7. Mud then exits out through the drill bit 6 and travels up the annulus 15 of the wellbore 2 to the surface where it is carried back to the mud pit 16 by way of a conduit 17.

The pressure of the mud that passes through the mud pump system is monitored by a pressure sensor 18 which is mounted on the stand pipe 10. The pressure sensor 18 transmits the pressure of the mud pump system to the surface receiver box 19 via wireless radio waves 20.

The downhole tool 8 measures the wellbore inclination every time the mud pump 9 transitions from an on-state to an off-state. All information gathered by the downhole tool 8 will be saved to the internal memory of the downhole tool 8. This information can be retrieved later after the downhole tool 8 is brought to the surface. When specifically directed, the information gathered by the downhole tool 8 is communicated to the surface receiver box 19 through the mud pump system by way of a pressure release communications method. This pressure release communications method is initiated by a timed series of on-off transitions of the mud pump system and is controlled at the surface. When the specified timed series so on-off transitions of the mud pump systems is detected by the downhole tool 8, it starts the pressure release communication process.

On the next off-cycle of the pumps of the mud pump system, the downhole tool 8 measures the wellbore inclination and activates the actuator. The actuator restricts the movement of the float valve 7. On the next on-cycle of the pumps of the mud pump system, pressure will be generated across the float valve 7 because of its restricted movement. The mud pump system will also generate a pressure observed by the surface receiver box 19 by way of the wireless interface 20 to the pressure sensor 18 mounted on the stand pipe 10.

The downhole tool 8 also contains a pressure sensing device. Once the downhole tool 8 has established a stable pressure across the float valve 7, it will deactivate the actuator so as to allow the float valve 7 to move. When a portion of the pressure across the float valve 7 has been released, the downhole tool 8 will reactivate the actuator so as to stop the movement of the float valve 7. This reduction of pressure across the float valve 7 will be seen throughout the mud pump system and will be transmitted to the surface receiver box 19 via wireless link 20 to the pressure transducer 18 on the stand pipe 10.

After a period of time that is proportional to the inclination of the wellbore 2, and as described hereinafter, the downhole tool 8 will deactivate the actuator so as to allow the remaining pressure across the float valve 7 to be released. This second release of pressure will be seen at the surface receiver box 19 just as the first release of pressure was observed by the surface receiver box 19. The time between the first release of pressure across the float valve 7 and the second release of pressure across the float valve 7 is proportional to the inclination of the wellbore 2. This time between pressure releases is measured by the surface receiver box 19. This information is used to calculate the inclination of the wellbore and is displayed to an operator.

Figure 2:
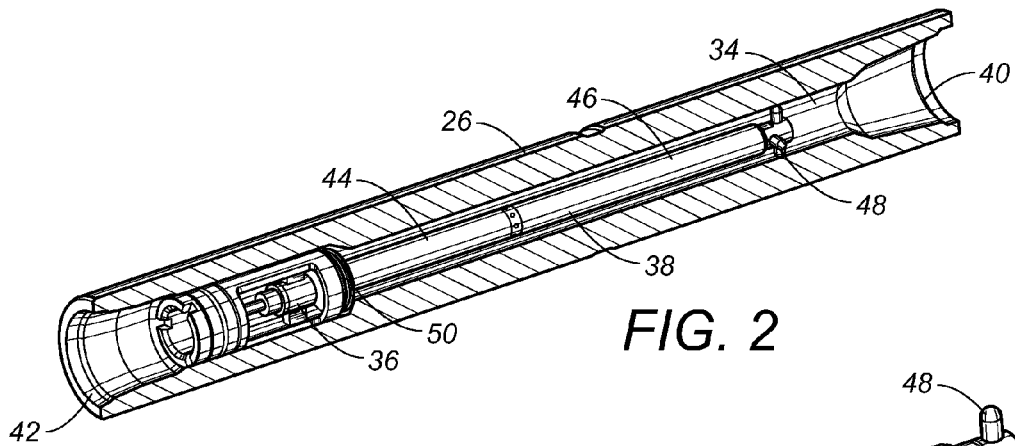
FIG. 2 is a perspective cut-away view of the drilling sub with the sensor, valve and actuator secured within the fluid passageway therein.

FIG. 2 is a cut-away view showing the drilling sub 26 that is secured to an end of the drill string 18 and between the drill string 18 and the BHA. The drilling sub 26 includes an interior passageway 34 extending axially longitudinally therethrough. A float valve 36 is positioned to one end of the drilling sub 26 within the fluid passageway 34. The float valve 36 is a conventional float valve that is commonly used on drilling subs in the prior art. As such, the present invention does not significantly modify the basic construction of the drilling sub 26 or the float valve 36. However, in the present invention, an actuator is placed within the fluid passageway 34 so as to provide a proper action onto the float valve 36 so as to allow changes of pressure in the drilling mud to be provided in timed relation to the downhole condition.

Referring to FIG. 2, the drilling sub 26 has a threaded connection 40 at one end and another threaded connection 42 at an opposite end. Threaded connection 40 can be suitable for joining with the drill bit. Threaded connection 42 is suitable for joining with the BHA. The float valve 36 is positioned adjacent to the threaded connection 42. The tool assembly 38 includes an actuator section 44 and an electronic section 46. A stabilizer/centralizer 48 is positioned at one end of the electronic section 46 opposite the actuator section 44. A hanger 50 serves to position the tool assembly 38 adjacent to the float valve 36. Within the concept of the present invention, the determination of the downhole condition can be easily accomplished by installing the tool assembly 38 within the fluid passageway 34 of a conventional or slightly modified bit sub. In most situations, there will be no need to change the configuration of the conventional float valve 36 in order to accomplish the purposes of the present invention.

Figure 3:
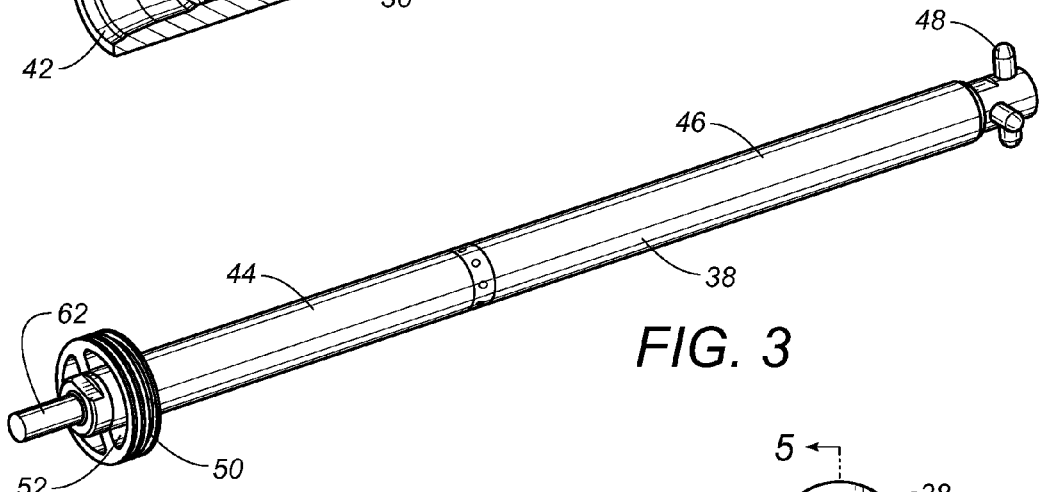
FIG. 3 is a perspective view of the actuator system as incorporated within the fluid passageway of the drilling sub of FIG. 2.

FIG. 3 is a more detailed illustration of the tool assembly 38 of the present invention. Tool assembly 38 includes the electronic section 46 and the pulser/actuator section 44. The stabilizer/centralizer 48 is provided at one end of the tool assembly 38. Hanger 50 is positioned at the opposite end of the tool assembly 38 opposite the stabilizer/centralizer 48. The hanger 50 is positioned so as to fix the location of the tool assembly 38 within the fluid passageway 34. The hanger 50 includes fluid passageways 52 therein so as to allow the drilling mud therethrough and therearound.

Figure 4:
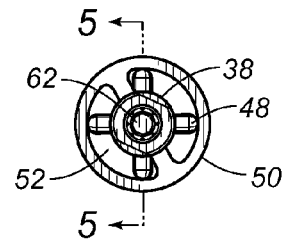
FIG. 4 is an end view of the hanger as used in the actuator system of FIG. 3.

FIG. 4 shows an end view of the tool assembly 38. As can be seen, the hanger 50 extends circumferentially in spaced relationship to the actuator section 44. The passageways 52 are formed on the hanger so as to allow fluid to pass therethrough. The stabilizer/centralizer 48 is illustrated through the openings of the fluid passageways 52. An actuator piston 58 is illustrated as positioned interior of the generally tubular tool assembly 38. It is this piston 58 which serves to impart the necessary action onto the float valve 36 so as to allow the present invention to carry out its intended purpose.

Figure 5:
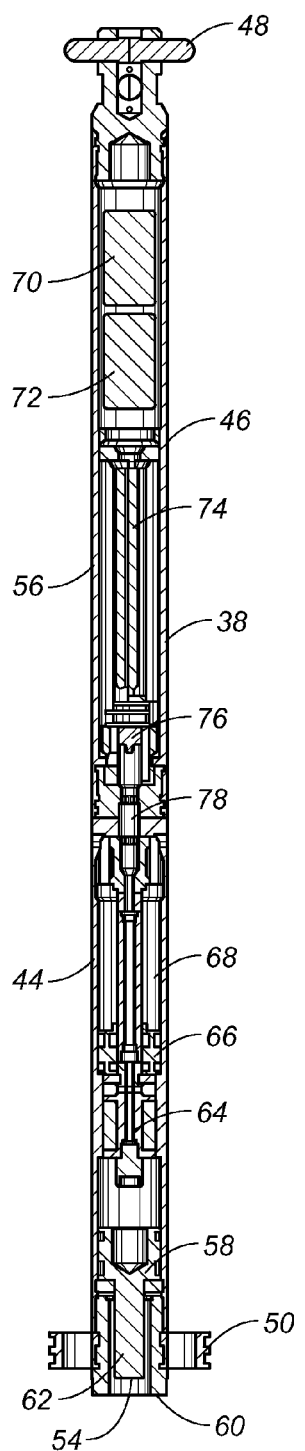
FIG. 5 is a cross-sectional view of the actuator system of the present invention as taken across line 5-5 of FIG. 4.

FIG. 5 is cross-sectional view of the tool assembly 38 in accordance with the teachings of the preferred embodiment of the present invention. The tool assembly 38 includes a generally tubular body 56 extending longitudinally from the stabilizer/centralizer 48 at one end to the hanger 50 at the opposite end. The actuator section 44 includes the actuator piston 58 adjacent to the end 60 of the tool assembly 38. A piston rod 62 extends outwardly with piston 58. The piston rod 62 has end 54 suitable for abutting the piston stem 88 of the float valve 36 (in the manner to be described hereinafter). A valve assembly 64 is placed rearwardly of the actuator piston 58 within the interior of the actuator section 44. Valve assembly 64 can utilize pneumatics or hydraulics so as to move the actuator piston 58 from its retracted position to another position. A pressure balance piston 66 is incorporated rearwardly of the valve assembly 64. A suitable return spring can be incorporated into the space 68 so as to urge the valve assembly 64 into its retracted position. The electronic section 46 includes batteries 70 and 72 located within the interior of the electronic section 46 and generally adjacent to the stabilizer/centralizer 48. The electronics 74 of the present invention are located forwardly of the batteries 70 and 72. An inclination sensor 76 is placed adjacent to the electronics 74 and rearwardly of the actuator section 44. A high pressure electrical bulkhead 78 will be positioned between the actuator section 44 and the electronic section 46.

In the present invention, the inclination sensor 76 is of a type presently available and utilized within the prior art. The electronics 74 are similarly available in the prior art. The electronics will process the information from the inclination sensor 76 so as to provide an output that would indicate the orientation of the drill bit within the wellbore. However, unlike the prior art, the electronics 74 are suitably connected to the actuator piston 58. As such, the electronics 74 of the present invention will serve to move the actuator piston 58 between a first position and a second position in timed relation. The timed relation can be based upon the angular inclination of the drill bit. For example, the movement between the first position and the second position can be a one second interval if the angular inclination is one degree. Alternatively, if the angular inclination is two degrees, then the interval between the movement between the first position and the second position of the actuator piston 58 can be two seconds. Still further, if there is a five degree angle of inclination, then the time interval between the first position and the second position can be five seconds. As will be described hereinafter, this movement will cause pressure changes in the drilling mud that can be sensed from the surface location. As such, if the pressure changes would occur two seconds apart, then the operator would know that there was a two degree angle of inclination. Various fractional angles can also be conveyed in a similar manner from the downhole condition to the surface location. All of the electronics are self-contained within the actuator section 44. As a result, no wireline connections are necessary to the surface location and no telemetry systems are required.

One form of the tool assembly 38 and its operation upon the actuator piston 58 is described in FIG. 5. However, it is possible that this tool assembly 38 could also be comprised of a piston, a magneto-rheological fluid, an orifice and a magnet. In the unlatched/free state, free piston axially movements force fluid through the orifice. To latch the piston, and thereby prevent axial movement, a magnet can be placed near the orifice. The magnetic field changes the magneto-rheological fluid into a more viscous, semi-solid, or solid state so as to impede flow. As a result, piston axial displacement is stopped. When axial displacement no longer needs to be fixed, the magnetic forces can be removed so as to allow fluid flow and to release the piston.

In the embodiment shown in FIG. 5, the tool assembly 38 may include a float valve, a stem, a piston, a coil, a magnetic bobbin, a non-magnetic housing, a differential pressure sensor, a pressure-balanced piston, a return spring, a wire tube and a magneto-rheological fluid. The float valve piston normally advances axially upon initiation of flow within the drill string. The actuator is positioned such that it allows independent piston advancement until making contact with the actuator stem. The actuator stem, in turn, acts on the latch piston which, in turn, acts on the magneto-rheological fluid within the system. Piston advancement displaces the magneto-rheological fluid through an annular gap between the housing and the coil. The fluid is displaced through this annular gap to displace the pressure-balanced piston or other similar pressure balance mechanism commonly used in downhole fluid systems on the opposite side of this annular gap. The magneto-rheological fluid remains in its liquid form until a current is applied to the coil. Current through the coil generates a magnetic field. This field then changes the state of the fluid and the annular gap to a more viscous, semi-solid or solid state so as to impede free flow through this gap. This, in turn, impedes axial advancement of the actuator, the piston stem and the float valve piston. In this "latched" state, flow through the float valve is partially restricted so as to create a larger than normal pressure drop across the valve. In order to release, or "unlatch," the current and its associated magnetic field are removed when it is desired so as to allow fluid flow through the annular gap between the coil and the housing. This allows free movement of the pistons and, thus, enables normal opening of the float valve. If released when flowing through drill string, this reduces the pressure drop across the float valve so as to generate the desired pressure drop (negative pulse), marking a hold/release time communicating to the surface. The closing/checking functionality of the standard float valve is never impeded by the latch.

Figure 6:
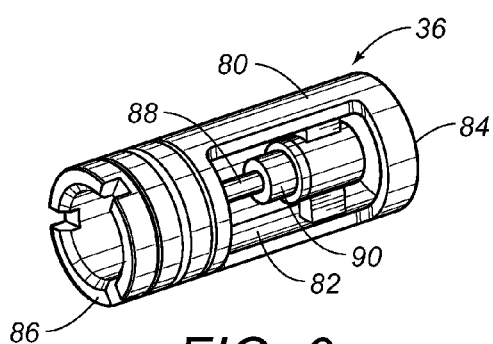
FIG. 6 is a view showing the float valve assembly as used in the system of the present invention.

FIG. 6 illustrates a view of the float valve 36 of the present invention. The float valve 36 is a standard float valve that is conventionally used in downhole operations. The float valve 36 includes a housing 80 having an annular interior 82. Float valve 80 has an end 84 generally abutting the hanger 50 of the tool assembly 38. The float valve 36 is fixedly secured within the interior passageway 34 of the drilling sub 26. A piston (not shown in FIG. 6) will extend across the interior 82 of the housing 80 so as to effectively block fluid flow therethrough when in one position. A piston stem 88 will extend from this piston and through the collar 90. The end of the piston stem 88 extending through collar 90 will be acted upon by the end 54 of the actuator piston stem 62.

Figure 7:
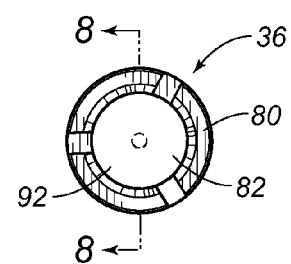
FIG. 7 is an end view of the float valve assembly of the present invention.

FIG. 7 shows an end view of the float valve 36 of the present invention. In particular, it can be seen that there is an annular passageway 82 within the interior of the housing 80. A piston 92 will extend entirely across this annular opening 82.

Figure 8:
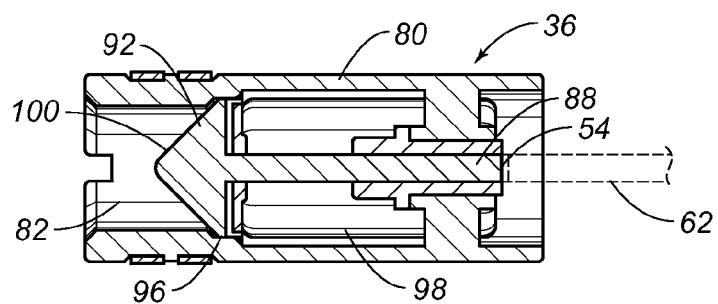
FIG. 8 is a cross-sectional view of the float valve assembly of the present invention as taken across line 8-8 of FIG. 7 showing the piston in a first position.
Figure 9:
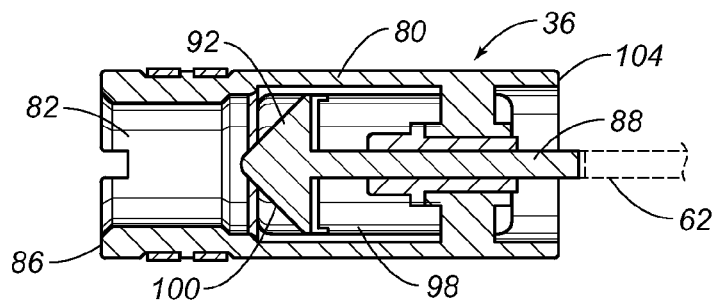
FIG. 9 is cross-sectional view of the float valve assembly of the present invention showing the piston in a second position.

FIGS. 8 and 9 illustrate the operation of the actuator piston stem 62 for the movement of the piston 92 of the float valve 36 between a pair of positions. In FIG. 8, the piston 92 is seated within the seat 96 within the interior 82 of the housing 80. As such, fluid flow through openings 98 is effectively prevented. The actuator piston stem 62 has its end 54 generally abutting the end of the piston stem 88 of piston 92. As such, rearward movement of the piston 92 is effectively blocked. The simple impeding of this axial movement requires a minimum of energy. In the position illustrated in FIG. 8, fluid pressure will be exerted against the face 100 of the piston 92.

In FIG. 9, the actuator piston stem 62 has been retracted inwardly of the actuator assembly 38. As a result, the piston 92 is moved to a second position within the interior 82 of the housing 80. This movement is rather automatic in view of the pressure exerted by fluid forces upon face 100 of piston 92. The piston stem 88 will also move toward the tool assembly 38 and outwardly of the end 104 of the housing 80 of float valve 36.

With reference to FIG. 9, an additional retracting movement of the actuator piston stem 62 can also occur so as to further open the piston 92 and move the piston 92 further away from the end 86 of housing 80.

The movement of piston 92 from the position illustrated in FIG. 8 to the position illustrated in FIG. 9 will create a pressure drop in the system. Since the time of the movement from the position illustrated in FIG. 8 to the position illustrated to the position in FIG. 9 is controlled by the electronics 74 of the tool assembly 38, pressure information can be conveyed in a simple and convenient manner. In another embodiment of the present invention, the further movement of the piston 92 to another position can also serve to further cause a pressure drop in the fluid within the downhole system. Under certain circumstances, it may be necessary to incorporate three movements to the piston 92 so as to accurately and properly convey information pertaining to the downhole condition to the surface location.

Figure 10:
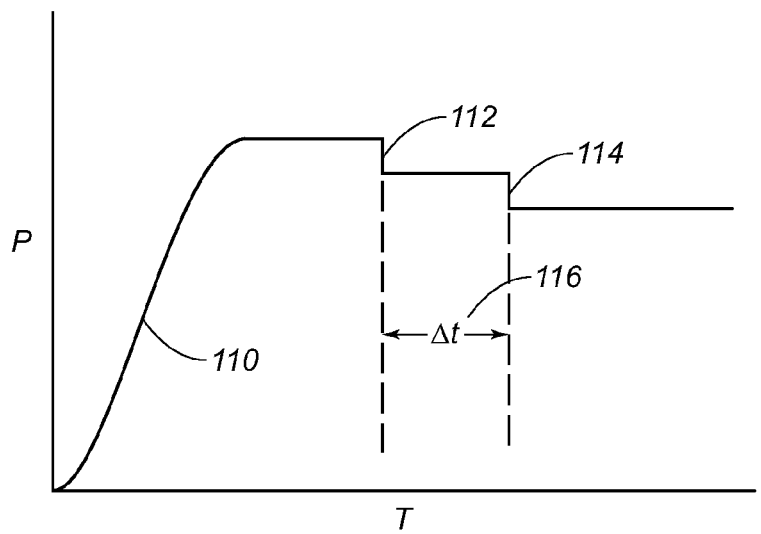
FIG. 10 is a graphical view illustrating the sensing of timed pressure changes.

FIG. 10 illustrates the manner in which this change of time of pressure changes can be conveyed to the surface. In FIG. 10, the horizontal axis represents time while the vertical axis represents pressure. Line 110 is illustrated as pressure building up in the system. This build-up of pressure occurs when the piston 92 is seated within its seat 96. Eventually, when the system pressure has equalized, the pressure will level out. When the piston opens, in the manner of FIG. 9, a pressure drop 112 will occur. When the piston opens further, as shown in FIG. 9, another pressure drop 114 occurs. Since the cause of the pressure drops is the relay of information from the sensor, through the electronics, to the actuator assembly and, in turn, to the stem 88 of the piston 92, the time of these pressure changes, represented by Δt 116 is correlative of the downhole condition. As stated previously, and merely as an example, if the Δt is two seconds, then the surface location will know that the drill bit has two degrees of deviation. If the Δt is 3.25 seconds, then the surface location will know that the change of orientation is 3.25°. It is believed that the system of the present invention can also be adapted to various other downhole sensor tools. In the present invention, the amount of pressure change is not very important. It is only the existence of the pressure change which is important to monitor. As such, the time between the pressure changes (regardless of the amount of pressure) provides the necessary information to the operator at the surface so as to determine the downhole condition.

Figure 11:
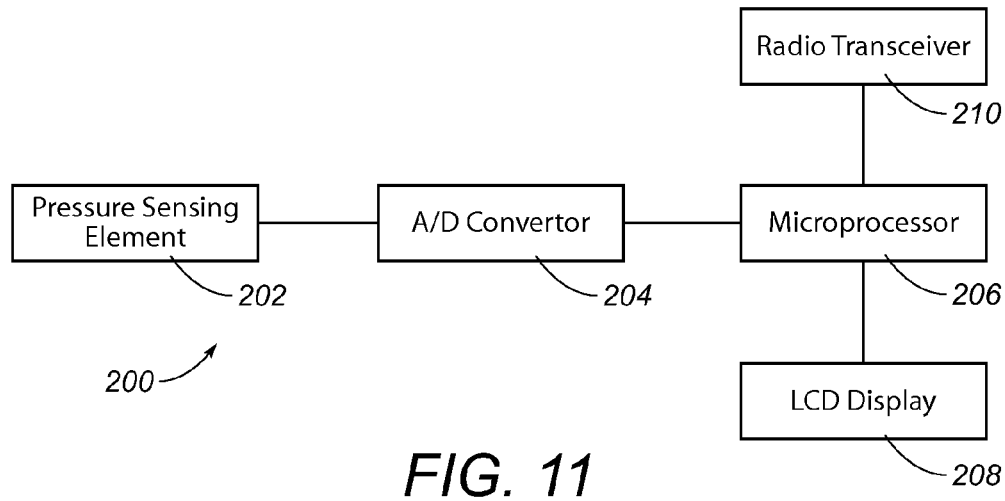
FIG. 11 is a block diagram of the pressure transducer in the surface system of the present invention.
Figure 12:
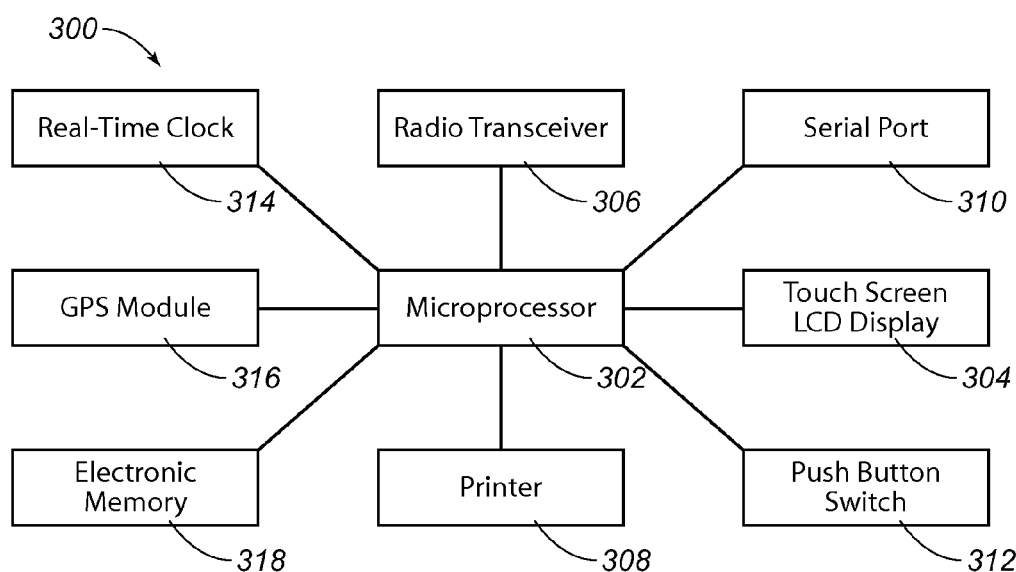
FIG. 12 is a block diagram of the surface receiver box in the surface system of the present invention.

FIGS. 11 and 12 show the surface system. The surface system includes a pressure transducer system 200, as shown in FIG. 11 and a surface receiver system 300, as shown in FIG. 12. The pressure transducer system 200 includes a pressure sensing element 202, an analog-to-digital convertor 204, a microprocessor 206, an LCD display 208, and a radio transceiver 210. The surface receiver system 300 contains a microprocessor 302, a LCD touch screen display 304, a radio transceiver 306, a printer 308, a serial port 310, a push button switch 312, a realtime clock 314, and a global positioning system (GPS) module 316. An electronic memory 318 is interactive with the microprocessor 302.

The surface receiver system 300 controls all aspects of the pressure transducer system 200 via the wireless interface between the systems 200 and 300. The surface receiver system 300 can set many parameters of the pressure transducer system 200. These parameters can include the data rate, the sample rate, the amount of sleep/active time, and the resolution and response of the LCD display 208 of the pressure transducer system 200.

During normal operation, the pressure transducer system 200 will be set for a low sample rate and a low LCD display update rate in order to conserve power. If the operator would like the inclination of the wellbore reported to the surface system, they would simply press the push button switch 312 on the surface receiver system 300. The surface receiver system 300 would wake up from a low power sleep state, start the GPS module 316 and a send a wake-up command to the pressure transducer system 200 by using its radio transceiver 306. The pressure transducer system 200 will receive the wake-up command via its radio transceiver 210 and will send an acknowledgment back to the surface receiver system 300. The surface receiver system 300 would then send commands to the pressure sensor system 200 in order to increase its sample rate and data rate so the communications between the downhole tool 8 and the surface receiver system 300 can occur through the mud pump system.

While the pressure transducer system 200 and the surface receiver system 300 are updating the interface between them, the GPS module 316 will be establishing communications with the geosynchronous satellites that are used for global positioning. Once this has been done, the GPS module 316 will determine the location of the surface receiver system 300. At the location of the surface receiver system 300 has changed, the surface receiver system 300 will prompt the user to enter the new location using the LCD touch screen display 304. The surface receiver system will prompt the user to verify the local time whether the location has changed or not. If the time is incorrect, the user will be able to update the local time by using the LCD touch screen display 304. This time can be gathered from either the GPS module 316 or the user will set the realtime clock 314 on the surface receiver system 300.

Once the set up is completed, the surface receiver system 300, by using its LCD touch screen display 304, will then step the user through the timed series of mud pump on-and-off cycles that are used to alert the downhole tool to send its latest inclination reading to the surface through the pressure release transmission system, described hereinbefore. The surface receiver system 300 will then look for two reductions in pressure and determine the time between them. The inclination of the wellbore 2 will be calculated based upon the time of the two pressure releases.

The inclination computed by the surface receiver system 300 will be displayed to the user. The user will be prompted to accept or reject this survey. If rejected, the surface receiver system 300 will inquire of the user if they would like to attempt the process again. If the survey is accepted, the user will be prompted to enter a depth of the survey. Once the process is completed, the surface receiver system 300 will send commands to the pressure transducer system 200 to reduce its sample rate and data rate and to resume the low power mode of operation. All surveys will be stored in the internal memory 318 of the surface receiver system 300. The accumulation of surveys will be available for download using the serial port 310 of the surface receiver system 300. The surface receiver system 300 will go into a lower power sleep state to conserve its battery power once the survey process is complete. It will remain in this state until the push button switch 312 is depressed.

Figure 13:
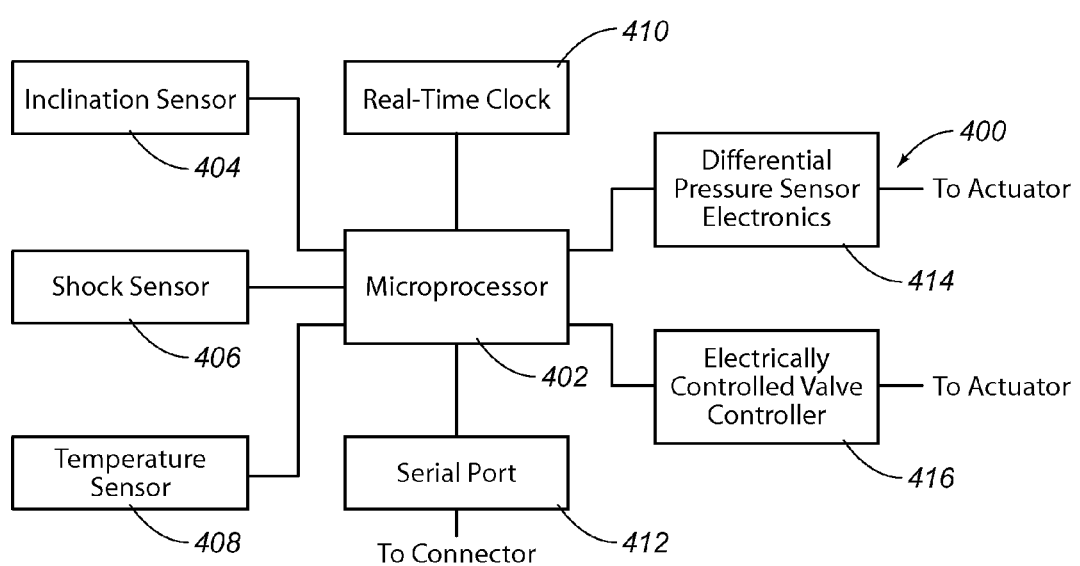
FIG. 13 is a block diagram of the microprocessor-based electronics section of the downhole tool of the present invention.

FIG. 13 shows the microprocessor-based electronic system 400 of the downhole tool 8. This electronic system 400 includes a microprocessor 402, an inclination sensor 404, a shock sensor 406, a temperature sensor 408, a realtime clock 410, and a serial port 412 in order to communicate outwardly of the downhole tool. The electronic system 400 also includes differential pressure sensor electronics 414 and an electrically-controlled valve controller 416 that are installed in the actuator section 44 of the downhole tool 8.

The downhole tool 8 is mounted in the drill collar 5 in the manner shown in FIG. 1. When the pumps 9 in the mud pump system are turned on, drilling mud is forced down the drill string 3 into the drill collar 5 and around the downhole tool 8 before exiting out the drill bit 6 and returning to the surface mud pits 16 by way of the annulus 15 of the wellbore 2. The rushing of fluid around the downhole tool 8 creates small shock and vibrations that are detected by the shock sensor 406 and the microprocessor-based electronic system 400 of the downhole tool e. When the mud pumps 9 are turned off, the shock sensor 406 turns off. This wakes the microprocessor 402 from a low powered sleep state. When the microprocessor 402 wakes up, it reads the inclination from the inclination sensor 404, the temperature from the temperature sensor 408, and the present time from the realtime clock 410. This information is stored in the electronic memory and can be retrieved at a later time by way of the serial port 412 when the downhole tool is at the surface.

Upon waking from its low power sleep state, the microprocessor 402 will also evaluate the time and duration of the previous on-and-off cycles of the mud pump 9. If the current off-state of the mud pump 9 is preceded by a predefined time series of on-and-off cycles of the mud pump 9, the microprocessor 402 will initiate the pressure release communication procedure. If the previous on-and-off cycles of the mud pump 9 do not conform with the predefined time series of on-and-off cycles of the mud pump 9, the microprocessor 402 will return to its low power sleep state until the next off cycle of the mud pump 9.

The foregoing disclosure and description of the invention is illustrative and explanatory thereof. Various changes in the details of the illustrated construction or in the steps of the described method may be made within the scope of the appended claims without departing from the true spirit of the invention. The present invention should only be limited by the following claims and their legal equivalents.

I claim:

1. A system for communicating downhole information through a wellbore to a surface location comprising:
   a drill bit;
   a drilling sub;
   a BHA interconnected between the drill string and the drilling sub;
   a valve means for providing a flow restriction to fluid passing through the wellbore, said valve means comprising a float valve mounted in said drilling sub suitable for controlling a flow of drilling mud in said wellbore;
   a sensor means positioned in the wellbore for sensing a downhole condition in the wellbore;
   an actuator means cooperative with the valve means for moving said valve means between at least two positions in timed relation to the downhole condition sensed by the sensor means; and
   a detector means positioned at the surface location and cooperative with the fluid passing in the wellbore for providing a measurement value at the surface location correlative to time between changes of pressure of the fluid in the wellbore, said valve means and actuator means being positioned within said drilling sub.

2. The system of claim 1, said sensor means being an inclination sensor means, the inclination sensor means for sensing an angle of inclination of said drill bit.

3. The system of claim 1, said float valve comprising:
   a housing positioned in said drilling sub;
   a piston slidably movable in said housing; and
   a piston stem connected to said piston and extending outwardly of said housing, said actuator means acting on said piston stem so as to move said piston in said housing in timed relation between two positions.

4. The system of claim 3, said actuator means comprising:
   an actuator piston movable between a first position and a second position, said actuator piston bearing on said piston of said float valve so as to impede an axial advancement of said piston stem.

5. The system of claim 1, further comprising:
   a pumping means positioned at the surface location for pumping drilling mud into the wellbore, said detector means sensing a change of pressure of the drilling mud.

6. The system of claim 1, said detector means comprising:
   a logic means for correlating a sensed time between changes in pressure to the downhole condition; and
   a display means for providing a generally realtime humanly perceivable indication of the downhole condition.

7. The system of claim 6, said sensor means being an inclination sensor means for sensing an angle of inclination of the drill bit, said angle of inclination of the drill bit being said downhole condition, said logic means for correlating said sensed time with said angle of inclination.

8. A method of communicating within a wellbore, the wellbore having a drilling mud circulation system therein, the circulation system being through a drill string, and a drilling sub affixed to said drill string, the method comprising:
   positioning a float valve in a fluid passageway of said drilling sub;
   forming a flow restriction within the circulation system, said flow restriction being said float valve;
   applying a quantified pressure of drilling mud in the circulation system against said flow restriction;
   sensing a quantifiable downhole condition;
   releasing a first percentage of pressure within said flow restriction at a first time;
   releasing a second percentage of pressure within said flow restriction at a second time, a time between said first time and said second time being correlative to the downhole condition; and
   determining the downhole condition at a surface location by sensing the time between said first time and said second time.

9. The method of claim 8, said step of sensing comprising:
   sensing an angle of inclination of a drill bit within the wellbore, said downhole condition being the angle of inclination.

10. The method of claim 8, further comprising:
    positioning an actuator in said drilling sub such that an actuator piston of said actuator cooperates with said float valve; and
    moving said actuator piston between a first position and a second position so as to cause said float valve to release said first percentage and said second percentage.

11. The method of claim 10, said step of determining comprising:
    measuring a time between release of said first percentage and release of said second percentage; and
    correlating said time to the downhole condition.

12. The method of claim 11, a drill bit being interconnected to an end of said drilling sub, said step of sensing comprising sensing an angle of inclination of the drill bit, the method further comprising:
    assigning a time value to a sensed angle of inclination; and
    moving said actuator piston between said first position and said second position at a time equal to said time value.

13. A system for communicating an angle of inclination of a drill bit during a downhole drilling operation to a surface location comprising:
    a drill string extending in a wellbore;
    a drilling sub connected to said drill string in said wellbore, the drill bit being interconnected to said drill string, the drilling sub having a fluid passageway therein;
    a valve means positioned in said drilling sub for providing a flow restriction in said fluid passageway;
    an actuator means cooperative with said valve means and positioned within said drilling sub, said valve means comprising a float valve mounted in said drilling sub suitable for controlling a flow fluid in said wellbore, said actuator means for moving said float valve between at least two positions;
    an inclination sensor means positioned in said drilling sub, said inclination sensor means for determining inclination of the drill bit, said inclination sensor means connected to said actuator means, said actuator means for acting on said valve means so as to release a first percentage of a fluid pressure through said flow restriction and a second percentage of the fluid pressure through said flow restriction in timed relation, the timed relation being correlated to the inclination of the drill bit; and a detection means positioned at the surface location for detecting change of fluid pressure and the timed relation therebetween so as to provide an indication of the drill bit.

14. The system of claim 13, said float valve comprising:

a housing positioned in said drilling sub;

a piston slidably movable in said housing; and a piston stem connected to said piston and extending outwardly of said housing, said actuator means acting on said piston stem so as to move said piston in said housing in timed relation between the two positions.

15. The system of claim 14, said actuator means comprising:

an actuator piston movable between a first position and a second position, said actuator piston bearing on said piston stem opposite said piston of said float valve so as to impede an axial movement of said piston stem.

* * * * *